Oct. 16, 1923.
M. SIGMAN
RAIN WATER PIPE TRAP
Filed Oct. 3, 1921
1,471,215
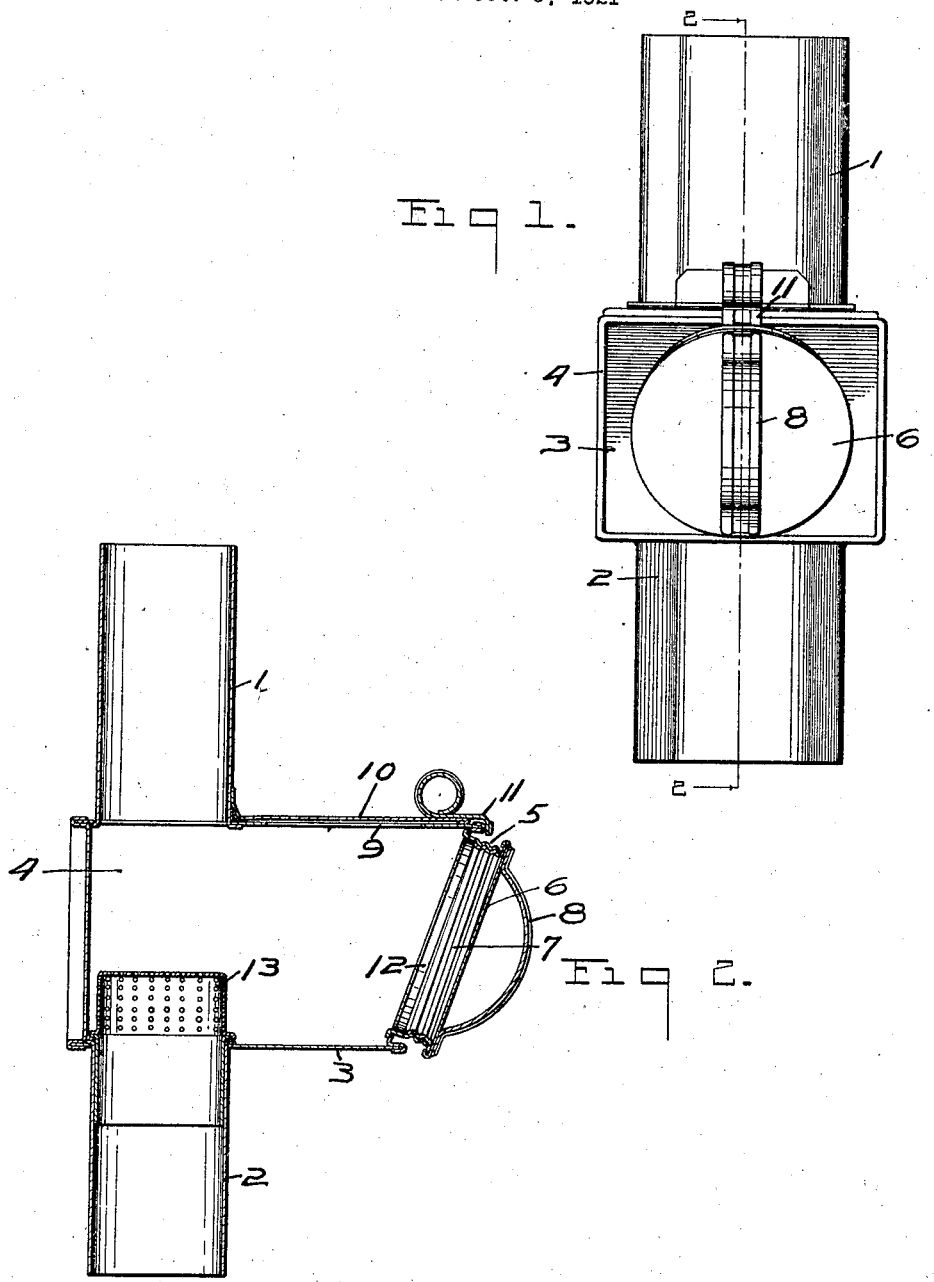

Patented Oct. 16, 1923.

1,471,215

UNITED STATES PATENT OFFICE.

MEYER SIGMAN, OF CLEVELAND, OHIO.

RAIN-WATER-PIPE TRAP.

Application filed October 3, 1921. Serial No. 504,938.

*To all whom it may concern:*

Be it known that I, MEYER SIGMAN, a citizen of the United States, and a resident of Cleveland, in the county of Cuyahoga and State of Ohio, have made an Invention Appertaining to Rain-Water-Pipe Trap; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a rain-water pipe trap wherein leaves, sticks, stones and other débris that may be washed from the roof into the pipes may be collected by the trap, the trap being so constructed that such foreign articles or materials may be readily removed from the trap.

The invention may be contained in structures which in their details partake of different forms, and to illustrate a practical application of the invention I have selected a structure containing the invention and shall describe it hereinafter. The structure selected is illustrated in the accompanying drawings.

Figure 1 of the drawings is a front view of the trap and the pipe to which it is connected. Fig. 2 is a side sectional view of the trap.

1 is the down pipe leading from the eaves-troughs or other rain-water collecting means to a sewer or to a cistern, the trap being connected to the sewer or cistern by means of the pipe 2. The pipe 2 is preferably a continuation of the pipe 1, or the pipes 1 and 2 are flanges connected to the trap whereby connection may be readily made in a pipe that leads from the rain collecting device to a sewer or a cistern. The trap 3 consists of a receptacle or container 4 which is preferably substantially rectangular in shape. It is formed of sheet metal and has a threaded flange 5 about a circular opening at its outer end. The opening is closed by the cover 6 having a correspondingly threaded flange 7. The opening may be thus sealed from leakage of water by threading the flange of the cover into the flange of the trap. If desired the cover may be provided with a handle 8. The top of the trap 3 is also provided with an opening 9 which is closed by a hinged cover 10. The cover 10 is held down by means of the elastic finger 11 that engages the edge of the trap 3. When, therefore, the trap is to be cleaned the cover 6 may be easily removed by unscrewing the cover and the cover 10 may be opened and the débris may be readily removed through the opening 12. If a stick or piece of shingle should be stopped in the trap, one end sticking up in the pipe 1 and having a length too great to remove it from the trap and the pipe 1, it may be readily broken by inserting one hand through the opening 9 and the other hand through the opening 12, whereupon the stick may be removed.

The outlet of the trap through the pipe 2 may be covered by the strainer 13 to prevent any of the material that collects in the trap 3 passing down through the pipe 2. The strainer 13 fits into the pipe 2 and extends well above the pipe 2 in the form of a cap. It is formed of sheet metal and is provided with a plurality of holes through which the water may flow into the pipe 2. The strainer 13 is thus of a shape that will give to its small openings a total area substantially the same as that of the cross sectional area of either the pipe 1 or 2 and moreover will hold the water back so as to cause some of it to collect in the trap 3 and retain a small portion therein and permit the settlement of all sediment in the trap 3.

I claim:

In a rain-water pipe trap, a receptacle connected to the water pipe and having inlet and outlet openings, one located in the top and the other located in the bottom, the receptacle having a third opening located in the end, a threaded flange surrounding the end opening, a cover having a threaded flange for fitting the flange about the end opening in the receptacle whereby the end opening may be tightly sealed, an inlet pipe connected to the top of the receptacle and an outlet pipe connected to the bottom of the receptacle through the top and bottom openings respectively, a cap strainer covering the outlet of the trap and extending into the trap, the lower edge of the cap strainer being located near the bottom of the receptacle and the lower edge of the end opening being also located near the bottom of the receptacle, a fourth opening located in the top, and a hinged cover for closing the last named opening whereby débris and foreign matter may be readily removed from the trap.

In testimony whereof, I have hereunto signed my name to this specification.

MEYER $\overset{\text{his}}{\times}$ SIGMAN.
$\phantom{MEYER\ \ }_{\text{mark}}$ Witnesses:
  A. W. MASSEY,
  A. L. KRAIG.